May 3, 1966 A. B. SEGUR ETAL 3,248,752

METHOD FOR REMOVING MEAT FROM ANIMAL CARCASSES

Filed April 27, 1965 3 Sheets-Sheet 1

INVENTORS:
ASA B. SEGUR
ROY A. FRICKE

BY: Dawson, Tilton, Fallon, Lungmus & Alexander
ATT'YS

May 3, 1966   A. B. SEGUR ETAL   3,248,752
METHOD FOR REMOVING MEAT FROM ANIMAL CARCASSES
Filed April 27, 1965   3 Sheets-Sheet 2
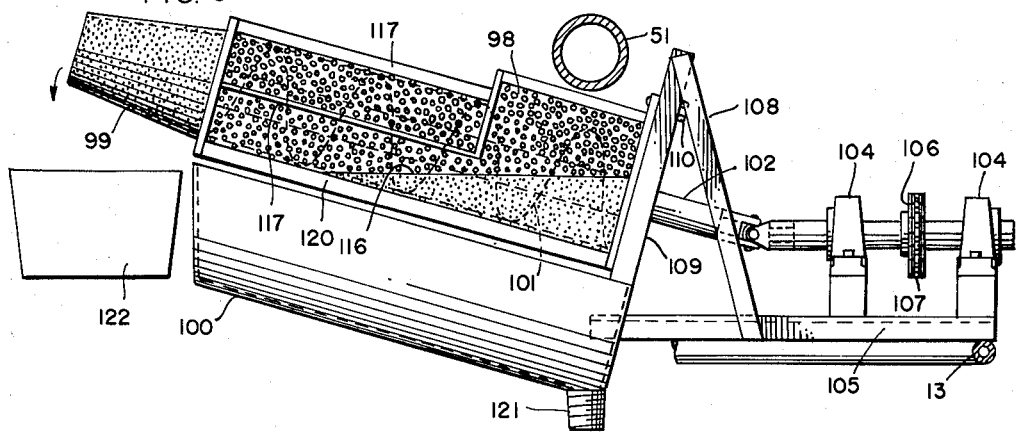
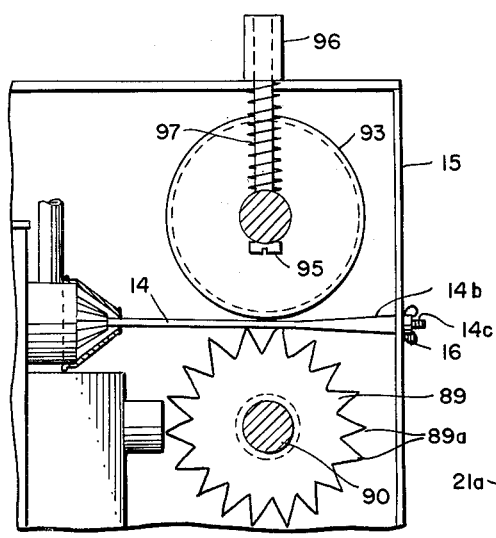
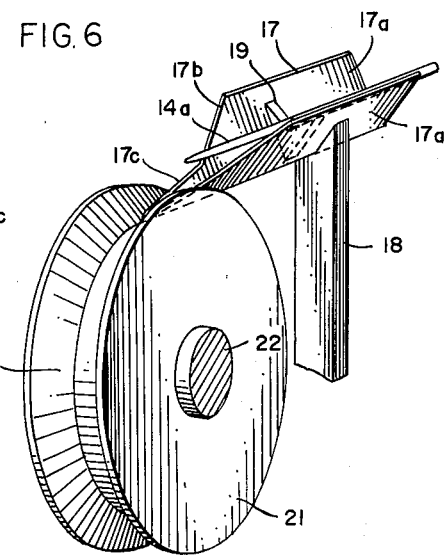
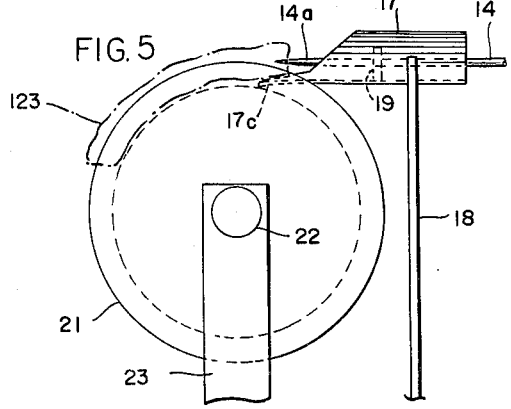
INVENTORS:
ASA B. SEGUR
ROY A. FRICKE
BY: Dawson, Tilton, Fallon, Lungmus & Alexander
ATT'YS May 3, 1966     A. B. SEGUR ETAL     3,248,752
METHOD FOR REMOVING MEAT FROM ANIMAL CARCASSES
Filed April 27, 1965     3 Sheets-Sheet 3
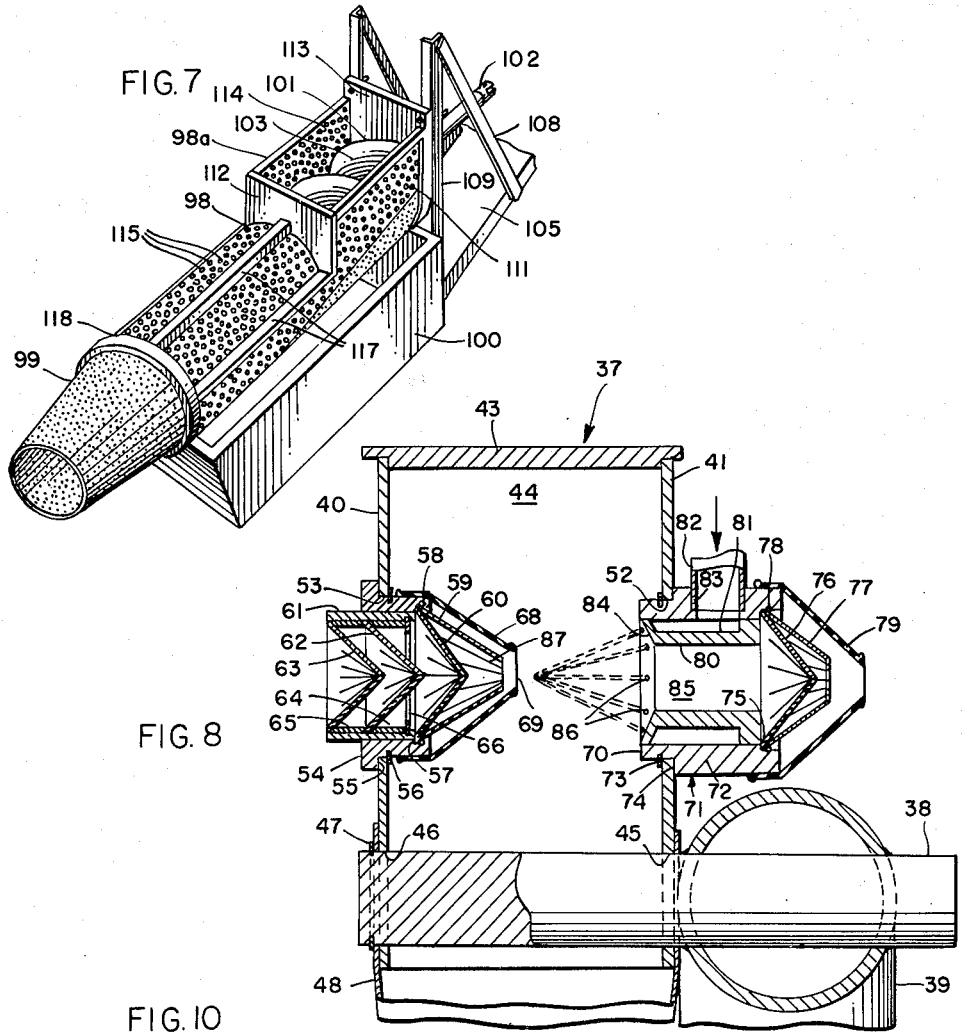
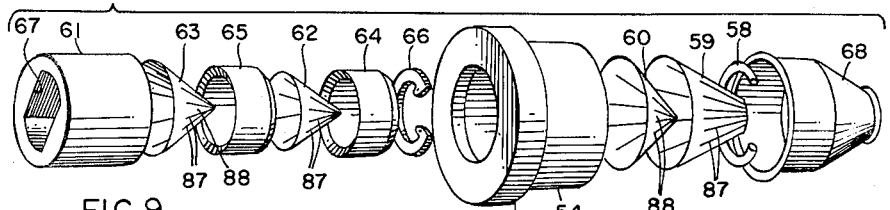
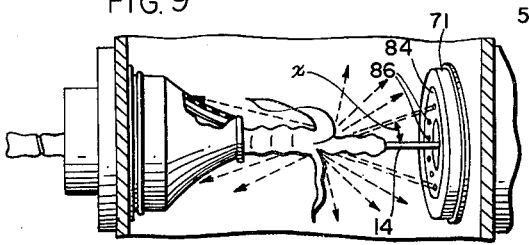
INVENTORS:
ASA B. SEGUR
ROY A. FRICKE
BY: Dawson, Tilton, Fallon,
Lungmus & Alexander
ATT'YS United States Patent Office 3,248,752
Patented May 3, 1966

3,248,752
METHOD FOR REMOVING MEAT FROM
ANIMAL CARCASSES
Asa B. Segur, Oak Park, and Roy A. Fricke, Forest Park,
Ill., assignors to A. B. Segur, doing business as A. B.
Segur & Company, Oak Park, Ill.
Filed Apr. 27, 1965, Ser. No. 451,188
16 Claims. (Cl. 17—45)

The present application is a continuation-in-part of our copending application Serial No. 259,011, filed February 18, 1963, and now abandoned.

This invention relates to a method for removing meat from the axial skeletons of animal carcasses, and more specifically, to a method for removing meat from the vertebral columns of such skeletons. The invention is particularly suitable for use in connection with the removal of meat from the vertebral columns of partially-cooked poultry carcasses.

A principal object of the present invention is to provide a simple and highly efficient method for removing meat in the vertebral regions of poultry carcasses, such meat generally being considered extremely difficult to remove without overcooking, shredding, or other undesirable prerequisities or results. Another object is to provide a highly efficient method for removing partially-cooked meat from about the vertebrae of poultry carcasses and the like without breaking off or removing bones or bone fragments with the meat. A further object is to provide a method by which the meat about the vertebral column of a poultry carcass may be removed in relatively large sections and in a partially-cooked state, such meat thereby being of high grade or quality suitable for use in preparing soups, meat pies, and other commercial products.

A still further object is to provide a method utilizing an apparatus for removing the meat from partially-cooked neck sections of poultry carcasses, the apparatus being operated by simply threading such necks onto one or more support rods, the necks thereafter being automatically advanced along such a rod into a meat removal station where the meat is automatically and forcefully removed from the skeletal components. In this connection, it is a specific object to provide a method for effectively removing such meat with the use of water, and thereafter separating the meat fragments from the water in an efficient manner. An important object of the invention also lies in the means for extracting water from the removed meat, such means operating continuously to squeeze water from the meat without further fragmenting or shredding that meat.

An additional object is to provide a method in which poultry necks are automatically advanced axially through a meat-removal station, the meat there being separated from the vertebrae of the neck sections, and the skeletal components then being advanced from the meat-removal station to a crushing station where the bones are crushed and detached from the support which directs their uninterrupted travel through the various stations.

Other objects will appear from the specification and drawings in which:

FIGURE 3 is a vertical cross sectional view taken along line 3—3 of FIGURE 1;

FIGURE 4 is an enlarged detail view of the crushing means for removing skeletal neck sections from the support rod;

FIGURE 5 is an enlarged side elevational view of the portion of the apparatus utilized for straightening poultry necks and for threading them upon the support rod;

FIGURE 6 is a perspective view of the structure illustrated in FIGURE 5;

FIGURE 7 is a perspective view of the water extraction means of the apparatus;

FIGURE 8 is an enlarged sectional view of the apparatus taken along line 8—8 of FIGURE 1, the support rod being omitted for clarity of illustration;

FIGURE 9 is a broken vertical sectional view illustrating the interior of the meat-removal chamber including the nozzle and the deflecting and restraining device as a poultry neck is being urged through that chamber;

FIGURE 10 is an exploded perspective view of the deflecting and restraining device.

Figure 1:
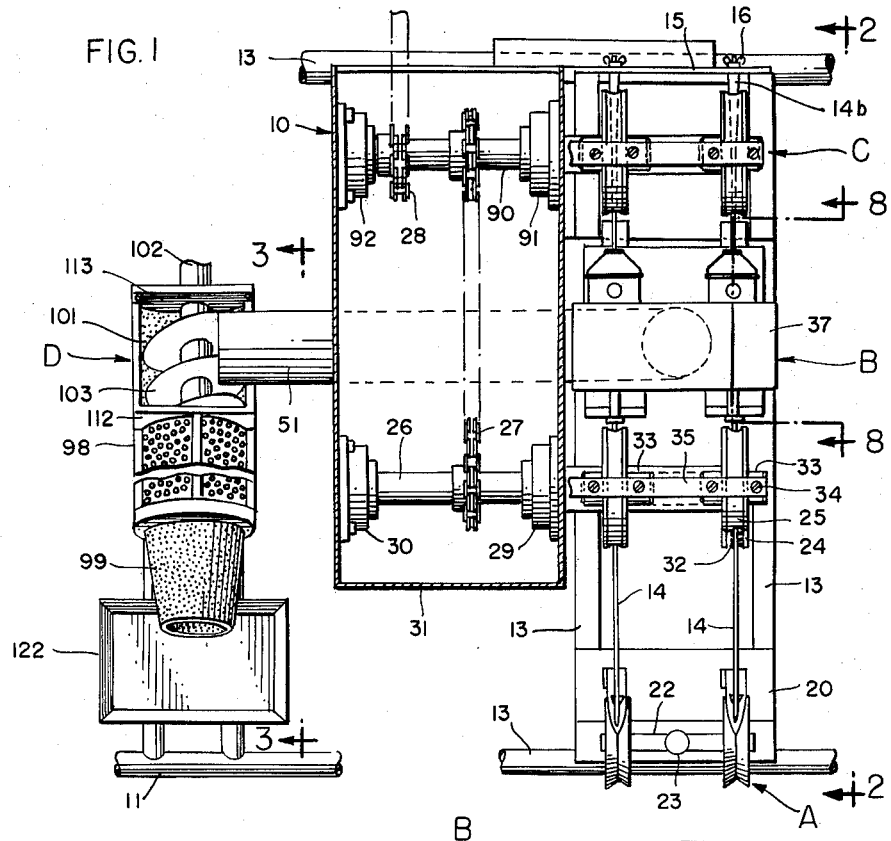
FIGURE 1 is a top plan view, shown partly in section, illustrating the apparatus of the present invention.

In the embodiment of the invention illustrated in the drawings, the numeral 10 generally designates the entire apparatus for use in the removal of meat from neck sections of poultry carcasses. The apparatus may be considered functionally as being composed of a neck threading station A, a meat-removal station B, a bone-removal station C, and a water-removal station D. Once a partially-cooked poultry neck section is introduced into the neck threading station, the apparatus takes over and the operations at the various remaining stations are performed automatically. Therefore, if an operator continuously introduces poultry necks, one by one, into the neck threading or receiving station A, the apparatus will operate continuously to separate the meat from such necks, to crush and discard the bones, and to extract water and pack the meat.

The apparatus as a whole includes a supporting frame 11 composed of tubular uprights 12 and interconnected horizontal tubular members 13. The uprights 12 are intended to rest upon a floor surface with the horizontal members 13 disposed approximately at waist level. The operating components for all of the stations A–D are directly or indirectly supported by these frame members and the apparatus as a whole is thereby maintained in stationary position.

Figure 2:
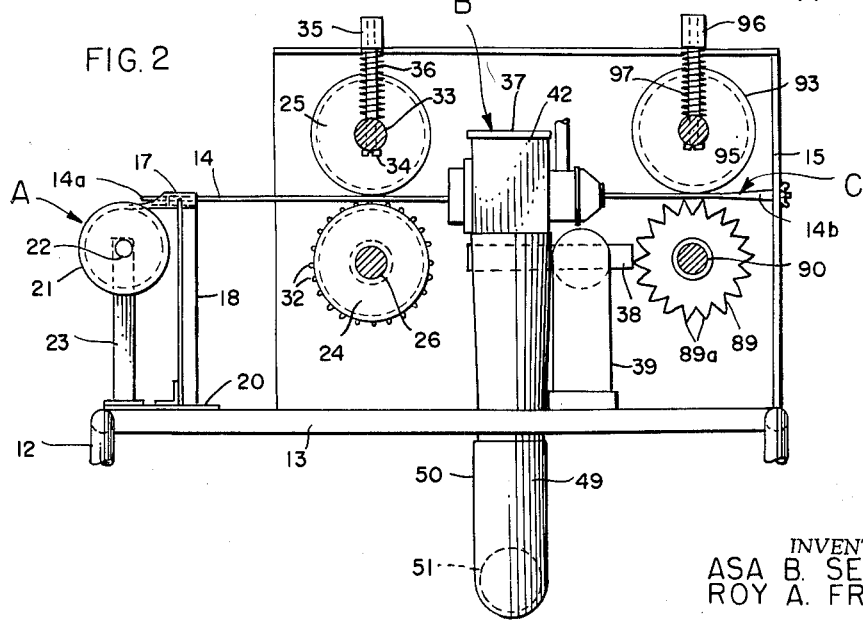
FIGURE 2 is a side elevational view of the apparatus taken along line 2—2 of FIGURE 1.

The neck threading, meat removal, and bone removal operations of stations A–C are all performed about a pair of slender support rods 14 (FIGURES 1 and 2). Necks are threaded onto such rods at the neck threading station A, the rods being slidably received in the vertebral canals of the partially-cooked poultry neck sections. The necks then slide along such rods to the meat-removal station B, and finally to the bone-removal station C.

The elongated rods 14 are disposed in spaced parallel relationship and extended along a horizontal plane. Throughout substantially its entire length, each rod 14 is of uniform diameter, preferably within the range of $\frac{1}{16}$ to $\frac{3}{16}$ of an inch. However, as illustrated most clearly in FIGURES 4–6, each rod has a gradually tapered forward end portion 14a, and a gradually enlarged rear end portion 14b. It has been found that a gradual increase in size of the rear end portion of the rod, terminating in a maximum size of approximately ½ of an inch in diameter, is effective for the purpose intended. The precise maximum diameter is not critical however, as long as that diameter is substantially greater than the diameter of the vertebral canal of the largest poultry neck supported by the rod. With respect to the rod's opposite forward end, it will be noted that the tip is pointed but is no sharpened. The purpose of the taper of forward portion 14a is to facilitate insertion of the rod into the vertebral canal of a poultry neck.

The two rods are identical in size and shape, and are mounted at their rear ends to an upstanding plate 15 secured to one of the horizontal frame members 13. To provide a rigid mounting for the rods at their rear ends, the plate may be provided with openings through which the threaded rear extensions 14c of the rods project.

Wing nuts 16 are then threaded onto the rearwardly projecting extensions of the rods for releasably clamping the rods in the horizontal positions illustrated.

The rods may be formed of stainless steel or some other material having similar characteristics. Strength and stiffness are primary requirements although, because of the high length-diameter ratio, such a rod necessarily has some degree of flexibility. In the absence of some intermediate or forward support, each rod would tend to droop from its point of rigid connection at the rear end thereof.

FIGURES 2, 5 and 6 illustrate means for supporting the front end portion 14a of each rod at substantially the same elevation as the rear end thereof. The same means is of assistance in guiding poultry necks into threaded condition upon each rod and, in the form illustrated, comprises a V-shaped trough 17 mounted at the upper end of an upstanding support arm 18 and equipped with a transverse partition 19 upon which the forward end portion of each rod is seated. Arm 18 is secured at its lower end to a platform 20 mounted upon horizontal frame members 13.

Each trough 17 is horizontally elongated and has its side portions or wings 17a sloping laterally and upwardly on each side of a rod's front portion 14a. The leading edges 17b of the wings slop downwardly, forwardly and inwardly, terminating at their lower ends in a forwardly projecting tongue 17c (FIGURES 5 and 6). The front end of the tongue projects forwardly aproximately ⅝ of an inch in front of the tip of rod 14, and the rod is supported above the bottom of the trough approximately 5/16 of an inch by the V-shaped partition 19, for the processing of chicken necks. It will be noted that the partition is spaced well behind the tip of the rod.

Each of the paired troughs 17 has its forwardly projecting tongue 17c terminating in contact with or in close proximity to, the V-shaped groove 21a of a roller 21. The rollers are journaled upon a pair of shafts 22 extending horizontally and transversely with respect to rods 14, the two shafts being mounted upon a standard 23 which is in turn secured to platform 20. It will be noted that the rotational axis of each collar 21 is spaced directly below the tip of a tongue 17c provided by one of the paired troughs and that each tongue extends tangentially with respect to the grooved periphery of the roller disposed directly therebelow.

Rods 14 and their associated elements are arranged in pairs so that a single operator may, using both hands, thread poultry neck sections on both rods simultaneously. Since the rods and their associated elements at neck threading station A, meat-removal station B, and bone-removal station C are identical, it is to be understood that the elements described in connection with one of such rods also applies to the other.

Between stations A and B are a pair of rollers 24 and 25 disposed above and below each rod. The rollers are disposed in a vertical plane passing through the axis of each rod and engage the upper and lower surfaces of neck sections advanced along that rod. The lower rollers, one for each rod, are mounted upon a transverse shaft 26 and are driven in a clockwise direction (when viewed in FIGURE 2) by an electric motor (not shown) operatively coupled to the shaft by endless chains 27 and 28. Shaft 26 is supported by journals 29 and 30 within a housing URE 2) by an electric motor (not shown) operatively 31 disposed to one side of stations A and B, the two driven rollers 24 being secured to a portion of the shaft which projects laterally from the housing beneath the paired rods 14. Each driving roller 24 is provided with two spaced rows of pins or teeth 32 which project radially from the rollers and which extend in circumferential series thereabout. The spacing between the two rows of pins of each rollers is important because the pins should engage the meat of a neck slidably supported by the rod thereabove without engaging or breaking the delicate processes or projections of the vertebrae. It has been found that a spacing between the rows of approximately ½ of an inch is effective for this purpose when chicken neck sections are being processed by the equipment, but it is to be understood that different distances may be desirable where the neck sections of poultry either larger or smaller than chickens are to be handled.

Each of the upper rollers 25 is an idler roller journaled upon its own shaft 33, each shaft being carried at the lower ends of a pair of rods or members 34 threadedly secured at their upper ends to a transverse mounting bar 35 affixed to housing 31. Compression springs 36 extend about rods 34 between mounting member 35 and shafts 33 and urge the shafts downwardly into engagement with the enlarged heads at the lower ends of the rods. The purpose of spring-loaded idler rollers 25 is simply to urge necks passing along horizontal rods 14 into engagement with the pins 32 of driving rollers 24 and to maintain the neck-supporting rods 14 in the generally horizontal condition illustrated in the drawings in response to upward forces exerted by the driving rollers upon neck sections engaged by the pins. Preferably, the upper idler rollers are peripherally grooved, as indicated in FIGURE 1, so that neck sections engaged thereby will not tend to slip laterally and cause lateral displacement of the front end portions of rods 14.

The meat-removal station or assembly B includes a housing 37 which is supported by a pair of parallel horizontal bars 38 projecting rearwardly from an inverted U-shaped housing support 39. The housing support 39 has its lower ends welded or otherwise permanently secured to horizontal frame members 13 and, as shown most clearly in FIGURE 8, each bar 38 extends through the bridging transverse portion of the housing support and is welded thereto.

Housing 37 has front, back, side, and top walls 40 through 43, respectively, which define an open-bottomed meat-removal chamber 44. The housing is rectangular in horizontal section and the flat front and rear walls thereof are provided with two pairs of horizontally-aligned openings 45 and 46 for receiving the rearwardly projecting portions of horizontal bars 38. Referring to FIGURE 8, it will be observed that the rear end of each horizontal bar is provided with an annular groove retaining a snap ring 47 for holding the housing securely but removably in place upon the parallel bars of the housing support.

Housing 37 also includes a lower funnel portion 48 which tapers downwardly and has its lower end received within the upstanding leg 49 of an L-shaped transfer pipe 50. The horizontal leg 51 of the transfer pipe extends transversely beneath housing 31 and terminates at water-removal station or assembly D.

The front and rear walls of the housing are provided with two sets of aligned apertures through which the neck-supporting rods 14 extend. Since the relationship between the housing and each rod is the same, and since the structural elements for removing meat from the neck sections carried by each rod are substantially identical, only the elements associated with one set of openings 52 and 53 will be described in detail.

Referring to FIGURE 8, it will be seen that a cylindrical sleeve 54 extends through opening 53 in the front wall of the housing and is securely but detachably connected to that wall by means of an outwardly-flared circumferential lip 55 on the outside of the casing and an annular snap ring 56 bearing against the wall within the chamber. The inner face of the sleeve adjacent the rear end thereof is stepped outwardly to define a circumferential shoulder 57 and immediately adjacent the shoulder (along the enlarged inner surface of the sleeve) is an annular groove which snugly receives a retaining ring 58. The retaining ring bears against the outer surface of a rearwardly tapering conical element 59 and holds the enlarged end of that element tightly against shoulder 57. Within the confines of element 59 is a second conical element 60 which is more sharply tapered and which is also held in place against shoulder 57 by retaining ring 58.

A mounting tube 61 is rigidly secured within the opening of sleeve 54 and, as shown in FIGURE 8, projects forwardly therefrom. Within the mounting tube are a pair of conical elements 62 and 63 which taper rearwardly as do elements 59 and 60 and which are detachably locked in place by liners 64 and 65 and by C-ring 66 (FIGURE 10). It will be observed that the front open end of the mounting tube 61 is partially closed by integral side portions 67, the inner edges of the portions extending vertically as shown in FIGURE 10. Preferably, a rearwardly tapering conical boot 68 formed of latex or any other suitable resilient and stretchable material is fitted upon the sleeve and projects rearwardly within chamber 44, the rear end of the boot being provided with a restricted opening 69 normally of a size smaller than the cross sectional dimensions of the poultry necks to be advanced through the apparatus.

The opening 52 of the housing's rear wall 41 receives the reduced front portion 70 of a nozzle 71, the enlarged portion 72 of the nozzle being disposed exteriorly of the housing. Like sleeve 54, nozzle 71 is securely but detachably connected to the housing by a snap ring 73 which holds the shoulder 74 between the enlarged and reduced portions of the nozzle tightly against the outer surface of wall 41. Access to the snap rings for the purpose of detaching the sleeve 54 and nozzle 71 for cleaning of the parts, or for any other purpose, may be achieved by removing the cover or top wall 43 which rests upon the upper edges of the upstanding front, rear and side walls.

At its rear end, the nozzle 71 is provided with an annular shoulder 75 which is engaged by the enlarged end of internal and external conical elements 76 and 77, respectively. Elements 76 and 77 are substantially identical to conical elements 60 and 59, respectively, and are similarly held in place by a retaining ring 78. A latex boot 79, similar to boot 68, is fitted over the rear end of nozzle 71.

Included as part of nozzle 71 is an annular insert 80. The insert may be permanently secured within the outer element of the composite nozzle and is provided with an annular recess which defines a distribution chamber or manifold chamber 81 when the elements of the nozzle are fully assembled as shown in FIGURE 8. Fitting 82 is secured within opening 83 in the wall of the nozzle and is affixed to a suitable conduit leading to a source of water under pressure.

Referring in particular to FIGURES 8 and 9, it will be observed that the front wall portion 84 of the nozzle 71 directly in front of the manifold chamber 81 slopes inwardly and rearwardly towards the central passage 85 extending through the annular nozzle. In other words, the wall 84 is frusto-conical in configuration, the projected apex of the cone being disposed within the nozzle and coincident with the longitudinal axis thereof.

It will also be observed that wall 84 is relatively thin and that it has a plurality of small, circumferentially-spaced jet openings 86 therein. Such openings are generally within the size range of .015 to .095 inch in diameter, the preferred range being .030 to .035 inch.

For reasons which will be brought out more fully hereinafter, the angular relationship between the converging jet streams and the line of travel of a poultry section through chamber 44 is critical. This angle, as designated by the letter "x" in FIGURE 9, should fall within the range of approximately 20 to 50 degrees and, preferably, within the range of 35 to 45 degrees. An angle of approximately 40 degrees has been found particularly suitable for use in dislodging meat from the vertebral columns of poultry carcasses.

The conical elements 59, 60, 62, 63, 76, and 77 may each be formed from thin, flexible sheet material such as stainless steel. If desired, a plastic material such as nylon having the requisite degree of flexibility and durability may alternatively be used. Referring to FIGURES 8 and 10, it will be seen that each conical element is provided with a plurality of uniformly and circumferentially spaced slits 87 which extend from the reduced open end of each member to points spaced from the member's enlarged end. Thus, the slits define a plurality of spring fingers 88 which in their untensioned state assume the relative positions illustrated in FIGURES 8 and 10.

It will be noted that the fingers of conical elements 77 and 59 have their free ends spaced apart to define restricted openings, whereas the fingers of the other conical elements have their ends in mutual contact when those fingers are in an untensioned state. The openings at the reduced end of conical members 59 and 77 are substantially smaller than the cross sectional dimensions of the smallest poultry neck or back section intended to be passed through housing 37. Since all of the axially-spaced conical members or elements taper rearwardly, a neck section urged rearwardly and axially therethrough will cause the spring fingers 88 to flex outwardly as indicated in FIGURE 9.

Where the apparatus is to be used for removing meat from carcass sections which include back as well as neck portions of the carcasses, it is necessary to remove the vertebral ribs before the thoracic vertebral region of each carcass is advanced into the meat-removal chamber 44. This may be readily accomplished by the integral side portions 67 of the mounting tube 61, the distance between the side portions being slightly larger than the maximum cross sectional dimensions of the neck and back portions (exclusive of the vertebral ribs) intended to pass therebetween. As a result, when a back section is urged axially along support rod 14 through the opening of the mounting tube 61, the upstanding side portions will knock off the vertebral ribs from which it is assumed that the meat will have been previously removed.

The bone-removal station or assembly C is disposed directly behind the housing 37 of meat-removal station B and comprises a pair of power-driven crushing wheels 89, one disposed beneath the rear portion of each rod 14 directly in front of the gradually tapered enlargement thereof. The crushing wheels 89 are provided with a plurality of outwardly projecting pointed teeth 89a and, as indicated in FIGURES 1 and 4, the wheels are secured to the laterally extending portion of a drive shaft 90 carried by journals 91 and 92 in housing 31 and rotated by chain 28 operatively connected to an electric motor or other suitable driving means. The axis of shaft 90 extends horizontally at substantially the same elevation as shaft 26 of the neck-advancing means. Shafts 26 and 90 are parallel and both extend in a transverse direction with respect to the axes of neck-supporting rods 14.

Directly above the crushing wheels 89 are a pair of spring-loaded idler rollers 93 holding the vertebrae of poultry neck sections in contact with the teeth of wheels 89. Each neck-supporting rod 14 has its rear portion disposed between a crushing wheel 89 and an idler roller 93, and extends in the same vertical plane as such wheel and roller. Each of the two idler rollers 93 is substantially identical to an idler roller 25 of the previously-described neck advancing means, and is similarly rotatably supported by a stub shaft 94 carried by spaced depending arms or rods 95, the rods being threadedly secured at their upper ends to a transverse arm 96 affixed to housing 91. Springs 97 urge each stub shaft downwardly into engagement with the enlarged head at the lower ends of rods 95. The grooved periphery of each idler wheel or roller 93 engages the bones of a poultry neck section and holds that section against upward movement in response to crushing forces applied by wheel 89.

Wheels 89 serve not only as crushing means but also as positive advancing means for forcing the vertebrae of poultry neck sections onto the gradually enlarging end portion 14b of each rod. Since the maximum diameter of rod 14 is substantially larger than the vertebral canals of the neck sections, the vertebrae are actually cracked open by the cooperative action of the crushing wheels and the rod enlargements 14b and are forceably removed from the rods. The bone fragments then drop downwardly where they may be collected in a suitable pan or other container (not shown).

It will be observed, therefore, that all of the steps of processing poultry neck sections to remove meat therefrom, including the steps of introducing the neck sections into the apparatus and thereafter dislodging and discarding the vertebrae from which meat has been removed, all occur along the axes of the paired neck-supporting rods 14. Furthermore, such steps occur as the necks are advanced axially along such rods, the rods at all times remaining in substantially stationary positions.

The meat, forceably removed from the neck sections in housing 37 by the high-pressure discharge of water, is flushed by the water through conduit 50 to the water-meat separating station or assembly D. Referring to FIGURES 7, 3, and 1, the water-meat separating assembly generally comprises a generally cylindrical perforated casing 98 having a tapered or frusto-conical nose 99, the casing being supported in inclined position below the discharge opening of leg 51 of conduit 50 and above a water collecting pan 100. Within the perforated cylindrical casing is a screw conveyor 101 comprising a shaft 102 equipped with a helical blade 103. The length of the blade is substantially the same as the length of casing 98 exclusive of nose portion 99, and the diameter of that blade, which is uniform throughout its entire length, is substantially the same as the inside diameter of the casing body. The spacing, if any, between the edges of the blade and the inner cylindrical surface of the casing body should not exceed .005 of an inch.

Shaft 102 is universally connected at its lower end to a shaft 103 journaled by mountings 104 and supported upon a platform 105 attached to horizontal frame members 13 (FIGURE 3). Shaft 103 is equipped with a sprocket 106 and is driven by a chain 107 operatively associated with the same electric motor or driving means which powers shafts 26 and 90.

The upwardly and forwardly sloping casing 98 and pan 100 are securely connected to frame 10 by frame members 108 and 109. Preferably, the casing is detachably mounted by wing bolts 110 or by any other suitable connecting means so that it may be removed, by sliding it axially off of screw conveyor 101, when cleaning is desired.

The inclination of the casing 98 has been found to facilitate the separation of meat and water and, in general, to increase the effectiveness of the meat-water separating assembly. It has been found that an inclination within the range of approximately 10 to 30 degrees is desirable, the most effective range being approximately 15 to 20 degrees.

The casing has been referred to as being generally cylindrical; however, it will be noted in FIGURE 7 that the rear portion 98a of the casing is only partially cylindrical, being semi-cylindrical about its lower section and having side walls 111 extending straight upwardly from its longitudinal midplane. A front wall 112 and a rear wall 113 combine with side walls 111 to define an open-topped chamber 114 for receiving meat and water from the discharge opening of conduit section 51.

With the exception of front wall 112 and rear wall 113, the walls of the entire casing are provided with a multiplicity of small drainage openings 115. The size of such openings has considerable bearing on the effectiveness of the device as a water-meat separator. In general, such openings should fall within the range of 0.2 to 0.8 of an inch.

In this connection, it has been found that particularly effective operation is achieved if the openings of casing body 98 are not all of the same size. Larger openings are preferable above a horizontal midline indicated at 116 in FIGURES 3 and 7, whereas smaller openings within the above range should be provided below that line. Since the entire casing is angled upwardly and forwardly, the section with smaller openings below the horizontal midline diminishes in area towards the front portion of the casing, whereas the section with larger openings above midline 116 increases in area in the same direction. It has also been found that the frusto-conical nose section 99 should be provided with openings of a size in the lower portion of the size range.

For example, it has been found that the closely-spaced perforations in the nose 99 and in the lower section of the casing body 98 should fall within a range of approximately .02 to .06 of an inch, whereas the openings above midline 116 in the casing body should be within the size range of approximately .04 to .08 of an inch. Preferred sizes are .03 to .05 and .05 to .07, respectively, with optimum sizes believed to be .04 of an inch for the smaller openings and .06 for the larger openings, although such sizes may be varied depending on the nature of the meat to be treated, and the rotational speed and other characteristics of the screw conveyor.

Reinforcement for the perforated casing may be provided in the form of longitudinally-extending members 117 running between wall 112 and a front support ring 118. Other longitudinally-extending reinforcing members, such as bottom member 120 (FIGURE 3) may be provided.

Pan 100 is provided at its lowermost end with a drain 121 (FIGURE 3) for the discharge of water separated from the meat. It is to be understood that drain 121 may be joined to any suitable hose connector for the discharge of the water. For the recovery of meat from which water has been extracted, a suitable pan 122 may be supported beneath the open front end of frusto-conical nose 99.

*Operation*

The apparatus may be operated by a single operator standing at the front of the machine directly in front of the neck threading station or assembly A. His job is to manually thread poultry neck sections upon the tapered front ends of support rods 14, the apparatus then performing all of the remaining operations automatically. To thread the necks upon the support rods, the operator simply grips two neck sections, one in each hand, with the end portion of each neck pointing forwardly and gripped between the thumb and middle finger of each hand. Partially-cooked poultry necks have a natural longitudinal curvature and, when such a neck is so gripped, this curvature should extend downwardly and then rearwardly. The lower curved portion of each neck is brought into contact with the front arcuate and grooved surface of roller 21, the roller tending to straighten the neck and thereby facilitate the threading operation. With the neck positioned as indicated in broken lines 123 of FIGURE 5, and with the end portion of the neck gripped between the thumb and middle finger, the index finger extending over the top surface of the neck, the operator simply guides the neck rearwardly along tongue 17c, until the tapered end of rod 14a enters the vertebral canal. Continued rearward and upward movement of the neck tends to cause the end of rod 14a to flex upwardly, thereby permitting the neck to slide smoothly over partition 19 and into contact with advancing rollers 24 and 25. There is no danger that the operator may catch his fingers between the advancing rollers because the neck section engaged by such rollers is pushed into roller-engaging position by manually-applied sliding forces exerted on other neck sections disposed in front of the rollers on the same rod. In other words, an operator will thread two or more neck sections upon each rod before the first-threaded section engages the driving rollers.

Roller 24 with its pins 32 is preferably driven at a speed which will tend to cause a gap in the series of neck sections advancing along each rod 14. A neck section engaged by the driving roller pushes other neck sections into and through the meat-removal assembly B. As a neck section passes into the chamber of housing 37, the high velocity jets of water or other suitable fluid discharged from the circumferential series of jet openings 86 impinge at acute angles on the neck section and, with a chiseling or prying action, dislodge meat from the vertebrae thereof. The velocity of the chisel-like streams may vary considerably, but it has been found that velocities of approximately 150 to 175 feet per second are effective in removing partially-cooked meat from poultry neck sections. If the meat is fully cooked, lower velocities have been found adequate and, conversely, higher velocities have been found desirable where the meat is only slightly cooked.

Of primary significance in obtaining effective meat removal action, are the dimensions of the jet streams and the angular relationship between those streams and the neck sections. With the size and angular relationships already described, it has been found that the high velocity streams effectively pry the meat forwardly and away from the vertebral column, as indicated in FIGURE 9. Moreover, this prying or peeling action occurs without breaking off the fine transverse or articular processes of the vertebrae threaded upon the rod. Also, by concentrating the streams so that they impinge on the vertebral column along a circumferential line between the meat and bones, the meat is pried away in relatively large strips or sections. It has been found that small pieces of meat which would otherwise be unobtainable remain connected to the larger strips of meat and are removed with those large strips or chunks.

Since the rod 14 is flexible and the high-velocity streams of water bear forceably against the sides of the neck sections carried thereby, there may be a tendency for the rod to vibrate during operation of the apparatus. If the rod is allowed to vibrate even to a slight extent, the chiseling action of the streams would be greatly impaired. The conical elements 59–63 and 76–77 therefore perform an essential function in preventing transverse movement or vibration of the loaded rod, as well as in centering that rod and the neck sections carried thereby.

The two series of rearwardly-tapering conical elements also act to restrain or prevent forward movement of a neck threaded upon the shaft, and as deflectors for preventing the escape of water from the chamber. Preferably, the conical elements are disposed and arranged so that the slits 87 of one are not in register or alignment with the slits of adjacent conical elements. It has been found that such an arrangement of cones effectively prevents the escape of water from the chamber despite the high velocity of the water discharged from nozzle 71. While boots 68 and 79 may also be used to provide additional protection against the escape of water from the chamber, it has been found that the conical elements are alone sufficient to prevent the escape of water if such elements are arranged in coaxial series with their slits 87 in staggered relation.

Each neck section is advanced through the meat-removal chamber by the section in end contact following immediately thereafter. By the time a neck section has passed into the central passage 85 of nozzle 71, substantially all of the meat has been removed therefrom. The stripped vertebral columns are advanced through conical elements 76 and 77, and then pass into engagement with the crushing and driving wheel 89 of the bone-removal station.

At the bone-removal station C, the teeth of driving wheel 89 forceably engage and tend to crush the vertebrae. Destruction of the vertebrae is ultimately achieved when they are forced to expand upon the gradually enlarged rear portion 14b of each rod 14. Preferably, the peripheral speed of driven wheel 89 is greater than the corresponding speed of wheel 24, so that a gap is drawn at the bone-removal station and the vertebrae, as they are being crushed and dislodged, do not retard the advnacement of other neck sections passing through the meat-removal station.

Since the streams of water for dislodging meat from the neck sections at the meat-removal station B is under extremely high pressure, there is an ample flow of water through conduit 50 to carry all of the removed meat to the water-meat separation station D. Meat, carried by a relatively large volume of water, is discharged from the transverse leg 51 of conduit 50 into the open-topped rear end of casing body 98. The relatively fine perforations in the casing below its horizontal midline 116 tend to retard the outflow of water and prevent fine particles of meat from escaping from the casing before they can be contacted by the conveyor blade. As the blade rotates continuously, it contacts the meat discharged into chamber 114 and directs it forwardly and upwardly towards frusto-conical nose section 99. The rotating blade also has a force component which directs water and meat outwardly or radially towards the cylindrical inner surface of the perforated casing body, However, only the water passes freely through such perforations or openings. This has been found true despite the fact that some of the meat particles or fragments might be of a size small enough to pass through such openings.

The reason that extremely fine meat particles do not pass outwardly through the perforations to any appreciable extent appears to result from the agglomeration or aggregation of meat particles to form masses which are too large to be squeezed through the openings. Also, fine meat particles appear to clump with large pieces thrown outwardly and forwardly by the screw, the larger pieces performing a shielding function in preventing the escape of the fine particles of meat.

By the time the meat has reached the forward end of the casing body and enters conical section 99, most of the water has been separated from the meat. Final extraction occurs in the conical section, along with a firm massing of all the meat particles and pieces. This massing or packing action takes place without any substantial breaking up or shredding of the larger pieces, an important advantage which bears on the marketability of the meat discharged from the reduced end of the conical section and falling into pan 122.

While we have disclosed the method and apparatus of the present invention in considerable detail for purposes of illustration, it is believed apparent that many of these details may be varied without departing from the spirit and scope of the invention.

We claim:

1. In a method for removing meat from the vertebral columns of animal carcasses, the steps comprising supporting a plurality of carcass sections containing vertebral columns in axial alignment upon a support rod threaded through the spinal canals thereof, and thereafter progressively stripping meat from said sections by advancing such sections rearwardly and axially between a plurality of converging high-velocity streams of water directed inwardly and forwardly against said sections while at the same time firmly maintaining said rod against transverse vibration as said sections are contacted by said high velocity streams.

2. The method of claim 1 in which there is the additional step of separating the water from the meat removed from said sections.

3. The method of claim 1 in which there is the further step of breaking the vertebrae of said sections to dislodge the same from said rod after the meat has been stripped from said sections.

4. The method of claim 3 in which said vertebrae are broken and dislodged by forcing the same axially onto a gradually enlarging portion of said rod having a maximum diameter substantially larger than the diameter of the vertebral canals.

5. A method for removing meat from the vertebral columns of animal carcasses comprising the steps of supporting a plurality of carcass sections containing vertebral columns in axial alignment upon a support rod threaded through the spinal canals thereof, progressively stripping the meat from said sections by moving the sections rearwardly along the axis of the rod between a plurality of converging high-velocity streams of water directed inwardly and forwardly in a direction opposite to the direction of movement of said sections while at the same time circumferentially engaging said sections to restrain transverse vibration thereof as said sections are contacted by said high-velocity streams.

6. The method of claim 5 in which the meat is stripped from said sections by high-velocity streams of water impinging on each section at an angle ranging between 20 to 50 degrees measured from the longitudinal axis thereof.

7. The method of claim 5 in which there is the additional step of continuing to advance said sections along the axis of said rod, after the meat is stripped therefrom, and then breaking and dislodging the vertebral sections from said rod.

8. The method of claim 7 in which the vertebral sections are broken and dislodged from said rod by advancing said sections into contact with a portion of said rod having gradually increasing diameter and having a maximum diameter substantially greater than the spinal canals of said sections.

9. The method of claim 5 in which the water of said streams, after it has impinged on said sections, carries the dislodged meat to a water-meat separating station, and in which there is the further step of separating the meat and water.

10. The method of claim 9 in which the meat is separated from the water by squeezing water from the meat and compacting the meat in a perforated casing having a screw conveyor therein.

11. In a method for removing meat from the vertebral columns of animal carcasses, the steps comprising supporting a carcass section containing a vertebral column upon a support rod threaded through the spinal canal thereof, dnrecting a circumferentially spaced series of high-velocity streams of water into surface contact with the periphery of said section and along a transverse plane at a velocity of approximately 150 to 175 feet per second, said streams being directed at an angle of between 20 to 50 degrees with respect to the axis of said section, and moving said section axially against said streams to strip meat from the vertebral column thereof.

12. In a method for removing meat from neck sections of poultry carcasses, the steps comprising simultaneously straightening and threading said sections upon a support rod passing through the spinal canals thereof, and progressively moving said sections along the axis of said rod between a plurality of converging high-velocity streams of water angled inwardly in a direction opposite to the axial movement of said sections, said streams of water impinging circumferentially against said sections as the same are moved axially to strip the meat therefrom.

13. The method of claim 12 in which there is the further step of conveying the meat removed from said sections by means of the water from said streams to a meat-water separating station, and thereafter separating the meat from said water.

14. The method of claim 13 in which there is the additional step of pressing the meat into a compact mass as the water is separated therefrom.

15. The method of claim 12 in which there is the further step of advancing the vertebral columns of said neck sections, after the meat has been stripped therefrom, into engagement with surfaces for crushing and expanding the vertebrae and thereby breaking the same from said rod.

16. In a method for removing meat from the vertebral columns of animal carcasses, the steps comprising threading a plurality of carcass sections containing vertebral columns in axial alignment upon a support rod extending through the spinal canals thereof, progressively advancing the sections along said rod while said rod is maintained in stationary condition, and stripping the meat from said sections as the same are advanced by directing a plurality of converging high-velocity streams of water impinging on said sections at an angle opposite to the direction of advancement of said sections.

References Cited by the Examiner

UNITED STATES PATENTS

| | | | |
|---|---|---|---|
| 1,492,697 | 5/1924 | Neuberth | 17—42 X |
| 2,646,592 | 7/1953 | Kennedy | 17—42 |
| 2,784,446 | 3/1957 | Beatty | 17—1 |
| 2,851,362 | 9/1958 | Goldberg | 99—107 |
| 3,017,661 | 1/1962 | Zartman | 17—45 |
| 3,089,775 | 5/1963 | Lindall | 99—107 |
| 3,090,486 | 5/1963 | Zebarth et al. | 209—90 |
| 3,154,804 | 11/1964 | Hensgen et al. | 17—1 |

SAMUEL KOREN, *Primary Examiner.*

LUCIE H. LAUDENSLAGER, *Examiner.*